United States Patent
Van Den Brink

(10) Patent No.: US 6,631,883 B1
(45) Date of Patent: Oct. 14, 2003

(54) METERING VALVE AND FUEL SUPPLY SYSTEM EQUIPPED THEREWITH

(75) Inventor: Alfred Van Den Brink, Barneveld (NL)

(73) Assignee: Teleflex GFI Europe B.V., Veenendaal (NL)

( * ) Notice: Subject to any disclaimer, the term of this patent is extended or adjusted under 35 U.S.C. 154(b) by 0 days.

(21) Appl. No.: 09/719,119

(22) PCT Filed: Jun. 9, 1999

(86) PCT No.: PCT/EP99/04036

§ 371 (c)(1),
(2), (4) Date: Feb. 22, 2001

(87) PCT Pub. No.: WO99/64773

PCT Pub. Date: Dec. 16, 1999

(30) Foreign Application Priority Data

Jun. 9, 1998 (NL) .............................................. 1009355

(51) Int. Cl.⁷ .............................................. F16K 31/02
(52) U.S. Cl. ............................ 251/129.16; 251/129.17; 251/129.07
(58) Field of Search ...................... 251/129.01, 129.07, 251/129.17, 129.16, 129.15, 30.05, 331; 239/585.1, 129.06

(56) References Cited

U.S. PATENT DOCUMENTS

| | | | | |
|---|---|---|---|---|
| 2,461,772 A | * | 2/1949 | Ray | 251/129.16 |
| 2,502,591 A | * | 4/1950 | Ray | 251/129.16 |
| 2,550,297 A | * | 4/1951 | Ray | 251/129.16 |
| 2,635,635 A | * | 4/1953 | Eimermann | 251/30.05 |
| 2,938,703 A | * | 5/1960 | Dietz | 251/129.16 |
| 3,671,009 A | * | 6/1972 | Stampfli | 251/129.07 |
| 4,099,701 A | * | 7/1978 | Berger | 251/30.05 |
| 4,196,751 A | * | 4/1980 | Fischer et al. | 251/129.16 |
| 4,418,886 A | * | 12/1983 | Holzer | 251/30.05 |
| 4,430,978 A | | 2/1984 | Lewis | |
| 4,500,067 A | | 2/1985 | Aukausky | |
| 4,771,808 A | * | 9/1988 | Rodger | 251/129.17 |
| 4,848,727 A | * | 7/1989 | Nanbu et al. | 251/129.16 |
| 4,852,605 A | * | 8/1989 | Gouhier | 251/129.16 |
| 4,860,990 A | * | 8/1989 | Fukuzawa et al. | 251/30.05 |
| 5,031,841 A | | 7/1991 | Schafer | |
| 5,118,072 A | * | 6/1992 | Sakamoto et al. | 251/129.17 |
| 5,238,223 A | * | 8/1993 | Mettner et al. | 251/129.06 |
| 5,269,333 A | * | 12/1993 | Richmond | 251/30.05 |
| 5,408,967 A | | 4/1995 | Foster | |
| 5,628,491 A | * | 5/1997 | Krone | 251/30.05 |
| 5,924,674 A | * | 7/1999 | Hahn et al. | 251/129.16 |

FOREIGN PATENT DOCUMENTS

| | | |
|---|---|---|
| DE | 2357263 | 8/1974 |
| DE | 2615917 | 2/1978 |
| DE | 3540997 | 5/1987 |
| FR | 946891 | 6/1949 |
| GB | 1450402 | 9/1976 |
| WO | 8904920 | 6/1989 |
| WO | 9808014 | 2/1998 |

* cited by examiner

*Primary Examiner*—Gene Mancene
*Assistant Examiner*—John Bastianelli
(74) *Attorney, Agent, or Firm*—Webb Ziesenheim Logsdon Orkin & Hanson, P.C.

(57) ABSTRACT

The invention relates to a metering valve for a fluid, provided with a housing with a metering opening and a movable closing member. The closing member is biased to one of its positions by biasing means co-acting therewith in the form of a pneumatic or hydraulic spring, and can be placed in another position counter to the bias by operating means. The pneumatic or hydraulic spring can herein be driven by the fluid for metering. The closing member can be a diaphragm with a relatively stiff central portion and a relatively flexible edge portion. A supply opening connected to a feed conduit for the fluid for metering can be arranged in the housing on either side of the diaphragm. The invention further relates to a system for supplying fuel to a the combustion engine, provided with a container for the fuel and a feed line connecting the container to the engine, in which line is received one or more metering valves of the above described type.

88 Claims, 1 Drawing Sheet

METERING VALVE AND FUEL SUPPLY SYSTEM EQUIPPED THEREWITH

BACKGROUND OF THE INVENTION

The invention relates to a valve for metering a fluid, provided with a housing with at least one metering opening and at least one closing member which is movable between a position closing the opening and a position leaving the opening at least partially clear, which closing member is biased by biasing means co-acting therewith to one of its positions and can be placed in the other position counter to the bias by operating means. Such a metering valve is known and is used for instance in fuel injection systems, particularly systems for injecting gaseous fuel, such as the LPG injection system marketed by Autogastechniek Holland B.V. under the name DGI.

Current metering valves or vapour injectors are provided with a closing member or plunger which is pulled from the seat by an electromagnet counter to the force of a mechanical spring and which is pressed by the spring back onto the seat after the electromagnetic force has been removed. Because the plunger must be opened counter to a spring force, the force required of the electromagnet is greater than should actually be necessary. Both the electromagnetic coil and the plunger must hereby be embodied disproportionately larger and heavier than would be necessary in the absence of the spring.

The unnecessarily heavy plunger causes problems in respect of the so-called rebounce, i.e. the rebound which occurs when the heavy plunger strikes at great speed against the upper stop at the end of the attractive phase of the electromagnet. This phenomenon of rebounce results in a non-linear and unstable metering behaviour, which is furthermore temperature and injector-dependent. As a result it is not easily possible to produce this type of vapour injector in large numbers with sufficient precision.

In the DGI system mentioned above, this problem is solved by using a control of the vapour injector with feedback, whereby variations in the metering behaviour as a result of rebounce are measured and can be corrected by feedback. However, this system is relatively expensive and therefore particularly suitable for group injection or monopoint injection, wherein a single central injector is present for metering of the gas, which is then guided alternately to the desired cylinders via a nozzle.

SUMMARY OF THE INVENTION

The invention therefore has for its object to provide an improved metering valve which is simpler, smaller and lighter than the known valve and which can thus be manufactured at lower cost. Such a valve would then be suitable for application in a system of individual injection per cylinder, or a multipoint injection system.

According to the invention this is achieved in that the biasing means comprise at least one pneumatic or hydraulic spring.

Owing to the pneumatic (or hydraulic) closing of the valve, preferably a diaphragm, optionally in combination with the electromagnetic opening thereof, the use of spring force becomes unnecessary. The coil and the plunger can hereby take a small and light form such that the problem of rebounce no longer occurs. The pneumatic or hydraulic spring is preferably operated by the fluid for metering. By using the fluid itself to operate the valve a simple and robust construction is obtained with relatively few components.

The operating means can advantageously be of electromagnetic type, whereby a simple control is possible. The operating means can herein then comprise a coil with U-shaped armature and at least one metal attraction element connected to the closing member. This attraction element is preferably plate-like. Thus, as a result of the chosen embodiment with the U-shaped armature and flat plunger plate, a relatively small electromagnetic force is required, so that a so-called high-impedance coil can suffice. This has the further consequence that the electrical control can be provided using a simple low side driver, such as is also known from modern petrol injection systems. If the metering behaviour of the valve were made the same as that of a petrol injector, it would even be possible to control the valve directly from the engine management computer of the petrol engine.

The closing member is preferably formed by a diaphragm. Such a diaphragm is light and of simple construction and can be operated with little force. The diaphragm then advantageously has a relatively stiff central portion co-acting with the opening for closing, and a relatively flexible edge portion. A good sealing and yet easy deformability of the diaphragm are thus obtained simultaneously.

The closing member can be accommodated in a housing which has on either side of the closing member at least one supply opening connected to a feed conduit for the fluid for metering. The closing member can thus be operated by admitting fluid on either side thereof. The supply openings are preferably dimensioned herein such that the fluid pressure in the housing on the side of the closing member directed toward the opening for closing is lower than the pressure on the opposite side thereof.

The invention further also relates to a system for supplying fuel to a combustion engine, provided with a container for the fuel and at least one feed line connecting the container to the engine, in which line is received at least one metering valve of the above described type. The engine herein preferably has a number of combustion chambers and at least one metering valve is present for each combustion chamber. A precisely operating multipoint injection system is thus obtained which can be manufactured in simple manner and at low cost.

BRIEF DESCRIPTION OF THE DRAWINGS

The invention will now be elucidated on the basis of an embodiment, wherein reference is made to the annexed drawing, in which.

DETAILED DESCRIPTION OF THE PREFERRED EMBODIMENTS

Figure 1:
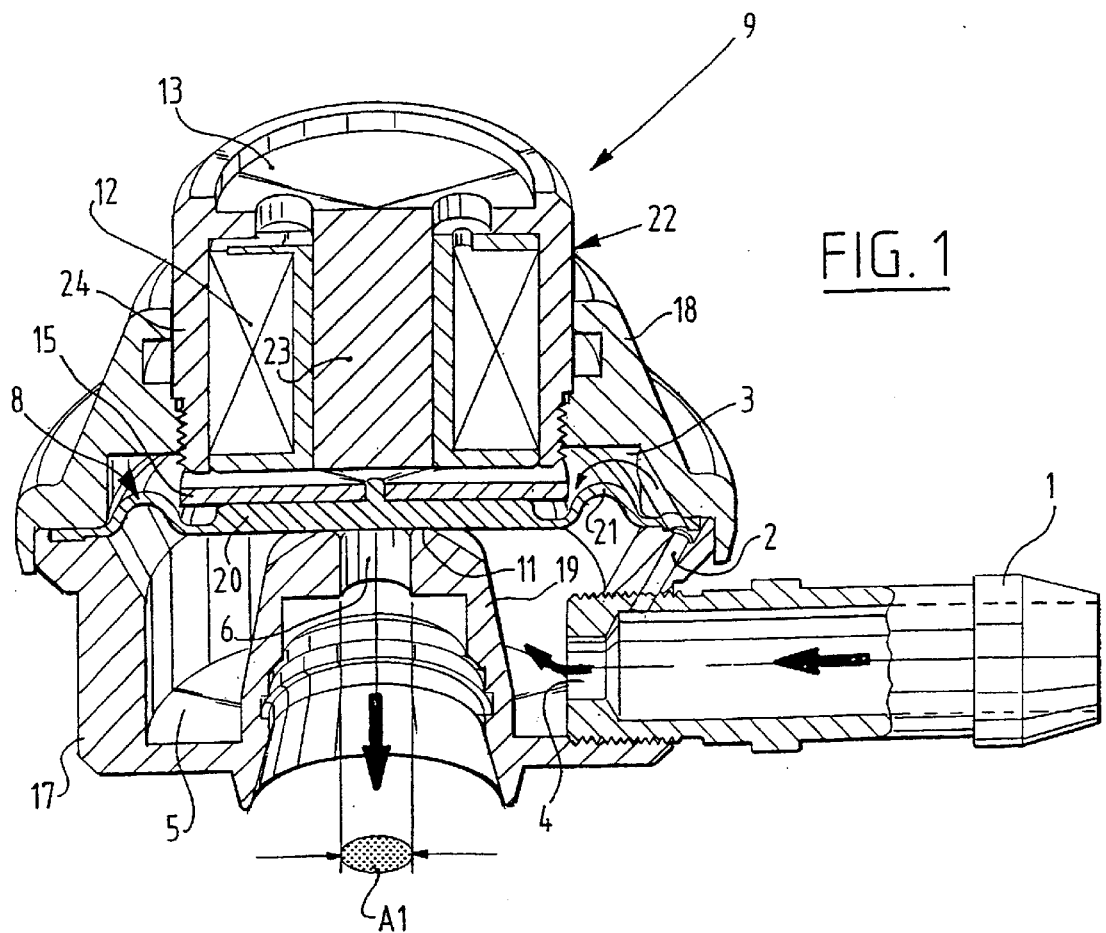
FIG. 1 is a cross-sectional perspective view of a metering valve according to the invention.

A metering valve 9 (FIG. 1) comprises a housing which consists of a base part 17 and a cover 18 placed sealingly thereon. A closing member 8 is arranged between cover 18 and base part 17 whereby the interior of the housing is divided into a control chamber 3 and a through-flow chamber 5. This through-flow chamber 5 is connected to a gas supply line 1 and a gas discharge line (not shown here). The gas discharge line is herein received in a connecting piece 19 to which through-flow chamber 5 is connected via an outlet opening 6. Around this outflow opening 6 is formed an annular valve seat 11 against which closing member 8 lies sealingly.

Closing member 8 here takes the form of a circular plastic diaphragm with a relatively stiff central portion 20 which co-acts with seat 11 around outlet opening 6 and a relatively flexible edge portion 21 situated round central portion 20. This edge portion 21 takes a curved form in cross-section, whereby it allows relatively large movements of central portion 20. Fixed onto central portion 20 is a plate-like metal attraction element 15 which forms part of the operating means for closing member 8. These operating means further comprise an electromagnet 22 formed by an armature 13 and a coil 12 wound therearound. Armature 13 herein comprises a core 23 and a cylindrical part 24 and therefore has in cross-section the form of a reverse W-shape or a pair of reverse U-shapes.

Both through-flow chamber 5 and control chamber 3 lying thereabove are connected to gas supply line 1. Recessed for this purpose in the wall of base part 17 and in the wall of cover 18 is a branch line 2 through which the fluid supplied through line 1 can flow to the control chamber. Further arranged between gas supply line 1 and through-flow chamber D is a narrowed passage or 'throttle' 4, the function of which is described below.

The metering valve 9 according to the invention now operates as follows. Vaporous fuel is supplied from an evaporator 10 via a conduit 7 (FIG. 2) to the gas supply line 1 and flows via passage 4 to through-flow space 5 beneath closing member 8. A part of the fuel simultaneously flows through branch channel 2 to control space 3 above diaphragm 8. The same gas pressure herein prevails on either side of diaphragm 8. On the upper side this pressure acts on the entire surface area of the diaphragm but on the underside only on the part of diaphragm 8 outside the seat 11. As a consequence of the thereby created difference in area A1, a closing force is generated whereby closing member 8 is pressed onto seat 11 and held fixedly in a position closing off outlet opening 6 of valve 9.

When the coil 12 of the electromagnet above closing member 8 is energized, an electromagnetic force is created between the armature 13 of coil 12 and the metal plate 15 fixed onto closing member 8. Closing member 8 is hereby pulled against armature 13 and outlet opening 6 is left clear. The vaporous fuel then flows from supply line 1 via passage 4 to outlet opening 6, which debouches via the discharge line (not shown) into the inlet manifold 14 of an associated cylinder of a combustion engine 16.

The narrowed passage 4 herein functions ashy 'throttle' or differential pressure regulator, whereby as a result of the flow of the fuel a pressure difference is generated between the through-flow chamber 5 beneath the diaphragm-like closing member 8 and the control chamber 3 thereabove. The downward directed suction force which is the result of the pressure difference is however overcome in this situation by the upward directed force which electromagnet 22 exerts an closing member 8. As soon as coil 12 is no longer energized however, the downward directed suction force immediately results in a downward directed displacement of closing member 8 to seat 11, whereby opening 6 is closed.

Figure 2:
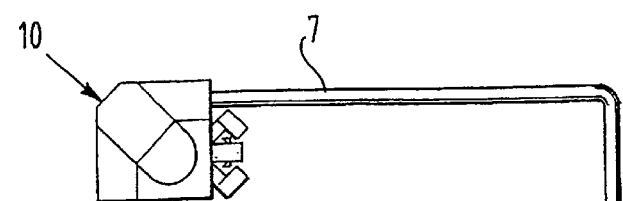
FIG. 2 shows schematically the structure of a fuel supply system in which such a metering valve is arranged for each cylinder.
Figure 2:
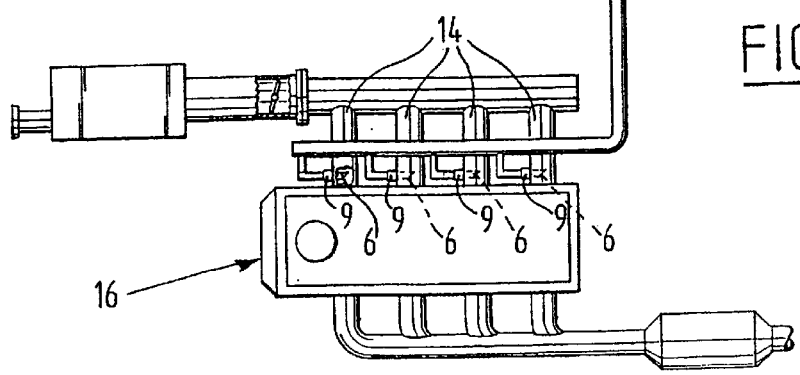

As a result of the simple and therefore low-cost construction thereof, the above described metering valve 9 can, as stated, be used advantageously in a system of individual injection per cylinder, i.e. a multipoint injection system as shown in FIG. 2. It is however also conceivable to apply valve 9 as single metering valve in a system with central fuel injection.

The invention is not limited to the above discussed embodiments and the scope of the invention is therefore defined solely by the following claims.

What is claimed is:

1. A metering valve for metering a fluid, comprising a housing connected to a fluid supply line and including at least one metering opening and at least one closing member which is movable in the housing between a position closing the metering opening and a position leaving the opening at least partially clear, with the closing member biased by at least one pneumatic or hydraulic spring co-acting therewith urging the closing member to its closed position and with the closing member arranged to be placed in the other position counter to the bias by operating means, with the pneumatic or hydraulic spring driven by the fluid for metering and including two chambers arranged in the housing and separated by the closing member, with each chamber having at least one supply opening connected to the fluid supply line, with the fluid supply line connected to the housing at the same side of the closing member as the metering opening, with the chamber at that side of the closing member forming a through-flow chamber and the chamber at the opposite side of the closing member constituting a control chamber, with the supply openings in the chambers dimensioned such that with the closing member in a position leaving the metering opening at least partially clear the pressure of the fluid in the through-flow chamber is lower than the pressure in the control chamber, and with the valve configured such that the closing member is biased to its closed position solely by the pneumatic or hydraulic spring, and further including a metal attraction element connected to the closing member and an electromagnet positioned adjacent to the metal attraction element wherein, upon energizing, the electromagnet is adapted to move the metal attraction element and thereby to move the closing member to the position leaving the opening at least partially clear.

2. The metering valve as claimed in claim 1, wherein the supply opening in the through-flow chamber is connected to the fluid supply line through a narrowed passage.

3. The metering valve as claimed in claim 1, wherein the supply opening in the control chamber is connected to the fluid supply line through a branch line arranged in a wall of the housing.

4. The metering valve as claimed in claim 3, wherein the electromagnet includes a coil with an armature.

5. The metering valve as claimed in claim 4, wherein the attraction element is plate-like.

6. The metering valve as claimed in claim 1, wherein the closing member is a diaphragm.

7. The metering valve as claimed in claim 6, wherein the diaphragm includes a relatively stiff central portion co-acting with the metering opening and a relatively flexible edge portion.

8. A system for supplying fuel to a combustion engine, provided with a container for the fuel and at least one feed line connecting the container to the engine, wherein in said at least one feed line is received at least one metering valve as claimed in claim 1.

9. The fuel supply system as claimed in claim 8 wherein the engine has a number of combustion chambers and at least one metering valve is present for each combustion chamber.

10. A valve comprising:
   a housing;
   a fluid passage disposed within the housing, the fluid passage including an outlet configured to communicate with a fluid supply;
   an electromagnetically responsive flexible closing member configured to close the outlet;
   a closing actuator configured to react to fluid pressure forces applied by fluid communicating with the fluid supply, such that when communication is effected with the fluid supply, the fluid pressure forces applied by fluid communicating with the fluid supply causes the closing actuator to apply forces to the closing member to effect closure of the outlet by the closing member; and an opening actuator configured to apply electromagnetic forces to the closing member for urging the closing member to open the outlet.

11. The valve as claimed in claim 10, wherein the outlet is defined by a valve seat disposed in the fluid passage, and wherein the closing member is configured to sealingly engage the valve seat and thereby close the outlet.

12. The valve as claimed in claim 11, wherein the outlet is open when the closing member is displaced from the valve seat.

13. The valve as claimed in claim 12, wherein the application of the electromagnetic forces to the closing member urges the closing member to become displaced or remain displaced from the valve seat.

14. The valve as claimed in claim 13, wherein the fluid is a gas.

15. The valve as claimed in claim 13, wherein the closing member comprises a diaphragm.

16. The valve as claimed in claim 15, wherein the closing member includes an electromagnetically responsive element.

17. The valve as claimed in claim 16, wherein the closing member includes a rolling convolution.

18. The valve as claimed in claim 17, wherein the closing member is secured to the housing.

19. The valve as claimed in claim 18, wherein the diaphragm includes a relatively stiff central portion configured to sealingly engage the valve seat, and a relatively flexible edge portion secured to the housing.

20. The valve as claimed in claim 19, wherein the relatively flexible edge portion includes the rolling convolution.

21. The valve as claimed in claim 20, wherein the relatively stiff central portion includes the electromagnetically responsive element.

22. The valve as claimed in claim 10, wherein the closing actuator is an hydraulic or pneumatic spring.

23. The valve as claimed in claim 22, wherein the outlet is defined by a valve seat disposed in the fluid passage, and wherein the closing member is configured to sealingly engage the valve seat and thereby close the outlet.

24. The valve as claimed in claim 23, wherein the outlet is open when the closing member is displaced from the valve seat.

25. The valve as claimed in claim 24, wherein the application of the electromagnetic forces to the closing member urges the closing member to become displaced or remain displaced from the valve seat.

26. The valve as claimed in claim 25, wherein the fluid is a gas, and the closing actuator is a pneumatic spring.

27. The valve as claimed in claim 25, wherein the closing member comprises a diaphragm.

28. The valve as claimed in claim 27, wherein the closing member includes an electromagnetically responsive element.

29. The valve as claimed in claim 28, wherein the closing member includes a rolling convolution.

30. The valve as claimed in claim 29, wherein the closing member is secured to the housing.

31. The valve as claimed in claim 30, wherein the diaphragm includes a relatively stiff central portion configured to sealingly engage the valve seat, and a relatively flexible edge portion secured to the housing.

32. The valve as claimed in claim 31, wherein the relatively flexible edge portion includes the rolling convolution.

33. The valve as claimed in claim 32, wherein the relatively stiff central portion includes the electromagnetically responsive element.

34. The valve as claimed in claim 33, wherein actuation of the hydraulic or pneumatic spring, when the outlet is closed by the closing member, biases the closing member towards the outlet to maintain closure of the outlet.

35. The valve as claimed in claim 34, wherein actuation of the hydraulic or pneumatic spring, when the outlet is open, biases the closing member towards the outlet to effect closure of the outlet.

36. The valve as claimed in claim 12, wherein the application of the electromagnetic forces to the closing member, when the outlet is closed by the closing member, overcomes the force applied by the closing actuator and causes the closing member to become displaced from the valve seat to thereby open the outlet.

37. The valve as claimed in claim 36, wherein the housing includes a first chamber and a second chamber, the outlet being disposed in the second chamber, and wherein the closing actuator is configured to effect fluid communication between the first chamber and the fluid supply when the outlet is closed such that fluid pressure forces are applied to the closing member from within the first chamber, and the closing actuator is also configured to effect fluid communication between the second chamber and the fluid supply when the outlet is closed such that fluid pressure forces are applied to the closing member from within the second chamber, and wherein the fluid pressure forces applied to the closing member from within the first chamber exceed the fluid pressure forces applied to the closing member from within the second chamber to thereby create a first net fluid pressure force acting on the closing member when the outlet is closed, and wherein the first net fluid pressure force effects closure of the outlet to be maintained by the closing member.

38. The valve as claimed in claim 37, wherein the first net fluid pressure force effects closure of the outlet to be maintained by the closing member when the opening actuator does not apply the electromagnetic forces to the closing member.

39. The valve as claimed in claim 38, wherein the application of the electromagnetic forces to the closing member when the outlet is closed by the closing member overcomes the first net fluid pressure force and causes the closing member to become displaced from the valve seat.

40. The valve as claimed in claim 39, wherein the fluid is a gas.

41. The valve as claimed in claim 39, wherein the closing member comprises a diaphragm.

42. The valve as claimed in claim 41, wherein the closing member includes an electromagnetically responsive element.

43. The valve as claimed in claim 42, wherein the closing member includes a rolling convolution.

44. The valve as claimed in claim 43, wherein the closing member is secured to the housing.

45. The valve as claimed in claim 44, wherein the closing member separates the first chamber from the second chamber.

46. The valve as claimed in claim 45, wherein the diaphragm includes a relatively stiff central portion configured to sealingly engage the valve seat, and a relatively flexible edge portion secured to the housing.

47. The valve as claimed in claim 46, wherein the relatively flexible edge portion includes the rolling convolution.

48. The valve as claimed in claim 47, wherein the relatively stiff central portion includes the electromagnetically responsive element.

49. The valve as claimed in claim 48, wherein the application of the electromagnetic forces to the closing member, when the outlet is open and fluid is flowing from the fluid supply and through the outlet, overcomes the force applied by the closing actuator to the closing member and thereby prevents sealing engagement of the valve seat by the closing member.

50. The valve as claimed in claim 49, wherein the closing actuator is configured to effect fluid communication between the first chamber and the fluid supply when the outlet is open and fluid is flowing from the fluid supply and through the outlet such that fluid pressure forces are applied to the closing member from within the first chamber, and the closing actuator is also configured to effect fluid communication between the second chamber and the fluid supply when the outlet is open and fluid is flowing from the fluid supply and through the outlet such that fluid pressure forces are applied to the closing member from within the second chamber, and wherein the fluid pressure forces applied to the closing member from within the first chamber exceed the fluid pressure forces applied to the closing member from within the second chamber to thereby create a second net fluid pressure force acting on the closing member when the outlet is open and fluid is flowing from the fluid supply and through the outlet, and wherein the second net fluid pressure force urges the closing member to close the outlet.

51. The valve as claimed in claim 50, wherein the second net fluid pressure force effects closure of the outlet by the closing member when the opening actuator does not apply the electromagnetic forces to the closing member.

52. The valve as claimed in claim wherein the application of the electromagnetic forces to the closing member opposes the second net fluid pressure force when the outlet is open and fluid is flowing from the fluid supply and through the outlet, and thereby prevents sealing engagement of the valve seat by the closing member.

53. The valve as claimed in claim 12, wherein the application of the electromagnetic forces to the closing member, when the outlet is open and fluid is flowing from the fluid supply and through the outlet, overcomes the forces applied by the closing actuator to the closing member and thereby prevents sealing engagement of the valve seat by the closing member.

54. The valve as claimed in claim 53, wherein the housing includes a first chamber and a second, chamber, the outlet being disposed in the second chamber, wherein the closing actuator is configured to effect fluid communication between the first chamber and the fluid supply when the outlet is open and fluid is flowing from the fluid supply and through the outlet such that fluid pressure forces are applied to the closing member from within the first chamber, and the closing actuator is also configured to effect fluid communication between the second chamber and the fluid supply when the outlet is open and fluid is flowing from the fluid supply and through the outlet such that fluid pressure forces are applied to the closing member from within the second chamber, and wherein the fluid pressure forces applied to the closing member from within the first chamber exceed the fluid pressure forces applied to the closing member from within the second chamber to thereby create a second net fluid pressure force acting on the closing member when the outlet is open and fluid is flowing from the fluid supply and through the outlet, and wherein the second net fluid pressure force urges the closing member to close the outlet.

55. The valve as claimed in claim 54, wherein the second net fluid pressure force effects closure of the outlet by the closing member when the opening actuator does not apply the electromagnetic forces to the closing member.

56. The valve as claimed in claim 55, wherein the application of the electromagnetic forces to the closing member opposes the second net fluid pressure force when the outlet is open and fluid is flowing from the fluid supply and through the outlet, and thereby prevents sealing engagement of the valve seat by the closing member.

57. The valve as claimed in claim 56, wherein the fluid is a gas.

58. The valve as claimed in claim 56, wherein the closing member comprises a diaphragm.

59. The valve as claimed in claim 58, wherein the closing member includes an electromagnetically responsive element.

60. The valve as claimed in claim 59, wherein the closing member includes a rolling convolution.

61. The valve as claimed in claim 60, wherein the closing member is secured to the housing.

62. The valve as claimed in claim 61, wherein the closing member separates the first chamber from the second chamber.

63. The valve as claimed in claim 62, wherein the diaphragm includes a relatively stiff central portion configured to sealingly engage the valve seat, and a relatively flexible edge portion secured to the housing.

64. The valve as claimed in claim 63, wherein the relatively flexible edge portion includes the rolling convolution.

65. The valve as claimed in claim 64, wherein the relatively stiff central portion includes the electromagnetically responsive element.

66. The valve as claimed in claim 52, wherein the fluid communication between the fluid supply and the second chamber is effected by a fluid passage, and wherein the fluid passage includes a throttle for causing an energy loss in gas flowing from the fluid supply to the second chamber to thereby effect the second net fluid pressure force.

67. The valve as claimed in claim 57, wherein the fluid communication between the fluid supply and the second chamber is effected by a fluid passage, and wherein the fluid passage includes a throttle for causing an energy loss in gas flowing from the fluid supply to the second chamber to thereby effect the second net fluid pressure force.

68. The valve as claimed in claim 52, wherein the fluid communication between the fluid supply and the second chamber is effected by a fluid passage, and wherein the fluid passage includes a pressure let-down means for causing a loss in pressure in gas flowing from the fluid supply to the second chamber to thereby effect the second net fluid pressure force.

69. The valve as claimed in claim 57, wherein the fluid communication between the fluid supply and the second chamber is effected by a fluid passage, and wherein the fluid passage includes a pressure let-down means for causing a loss in pressure in gas flowing from the fluid supply to the second chamber to thereby effect the second net fluid pressure force.

70. The valve as claimed in claim 52, wherein the fluid communication between the fluid supply and the second chamber is effected by a fluid passage, and wherein the fluid passage includes a narrowed passage for causing an energy loss in pressure in gas flowing from the fluid supply to the second chamber to thereby effect the second net fluid pressure force.

71. The valve as claimed in claim 52, wherein the fluid communication between the fluid supply and the second chamber is effected by a fluid passage, and wherein the fluid passage includes a narrowed passage for causing an energy loss in pressure in gas flowing from the fluid supply to the second chamber to thereby effect the second net fluid pressure force.

72. A valve comprising:

a housing;

a fluid passage disposed within the housing, the fluid passage including an outlet configured to communicate with a fluid supply;

a flexible closing member configured to close the outlet;

a closing actuator configured to react to fluid pressure forces applied by fluid communicating with the fluid supply, such that when communication is effected with the fluid supply, the fluid pressure forces applied by fluid communicating with the fluid supply cause the closing actuator to apply forces to the closing member to effect closure of the outlet by the closing member;

an opening actuator configured to apply forces to the closing member for urging the closing member to open the outlet;

wherein the closing actuator effects closure of the outlet by the closing member when the opening actuator is not applying forces to the closing member; and when the outlet is closed, actuation of the opening actuator overcomes the force applied by the closing actuator to the closing member to effect opening of the outlet.

73. The valve as claimed in claim 72, wherein the outlet is defined by a valve seat disposed in the fluid passage, and wherein the closing member is configured to sealingly engage the valve seat and thereby close the outlet.

74. The valve as claimed in claim 73, wherein the outlet is open when the closing member is displaced from the valve seat.

75. The valve as claimed in claim 74, wherein the application of the forces by the opening actuator to the closing member urges the closing member to become displaced or remain displaced from the valve seat.

76. The valve as claimed in claim 75, wherein the fluid is a gas.

77. The valve as claimed in claim 76, wherein the closing member comprises a diaphragm.

78. The valve as claimed in claim 77, wherein the closing member includes a rolling convolution.

79. The valve as claimed in claim 78, wherein the closing member is secured to the housing.

80. The valve as claimed in claim 79, wherein the diaphragm includes a relatively stiff central portion configured to sealingly engage the valve seat, and a relatively flexible edge portion secured to the housing.

81. The valve as claimed in claim 80, wherein the relatively flexible edge portion includes the rolling convolution.

82. The valve as claimed in claim 81, wherein the closing actuator is a hydraulic or pneumatic spring.

83. The valve as claimed in claim 77, wherein the opening actuator is configured to apply electromagnetic forces to the closing member, and the closing member includes an electromagnetically response element.

84. The valve as claimed in claim 83, wherein the relatively stiff central portion includes the electromagnetically responsive element.

85. The valve as claimed in claim 12, wherein the application of the forces to the closing member by the opening actuator, when the outlet is closed by the closing member, overcomes the forces applied by the closing actuator and causes the closing member to become displaced from the valve seat to thereby open the outlet.

86. The valve as claimed in claim 85, wherein the housing includes a first chamber and a second chamber, the outlet being disposed in the second chamber, and wherein the closing actuator is configured to effect fluid communication between the first chamber and the fluid supply when the outlet is closed such that fluid pressure forces are applied to the closing member from within the first chamber, and the closing actuator is also configured to effect fluid communication between the second chamber and the fluid supply when the outlet is closed such that fluid pressure forces are applied to the closing member from within the second chamber, and wherein the fluid pressure forces applied to the closing member from within the second chamber to thereby create a first net fluid pressure force acting on the closing member when the outlet is closed, and wherein the first net fluid pressure force effects closure of the outlet to be maintained by the closing member.

87. The valve as claimed in claim 86, wherein the first net fluid pressure force effects closure of the outlet to be maintained by the closing member when the opening actuator does not apply the forces to the closing member.

88. The valve as claimed in claim 87, wherein the application of the forces to the closing member by the opening actuator, when the outlet is closed by the closing member, overcomes the first net fluid pressure force and causes the closing member to become displaced from the valve seat.

* * * * *

UNITED STATES PATENT AND TRADEMARK OFFICE
CERTIFICATE OF CORRECTION

PATENT NO. : 6,631,883 B1 Page 1 of 1
DATED : October 14, 2003
INVENTOR(S) : Alfred Van Den Brink It is certified that error appears in the above-identified patent and that said Letters Patent is hereby corrected as shown below:

<u>Title page,</u>
Item [57], ABSTRACT,
Line 13, "to a the" should read -- to a --.

<u>Column 3,</u>
Lines 19-20, "chamber D" should read -- chamber 5 --.
Line 46, "ashy" should read -- as a --.
Line 54, "an closing" should read -- on closing --.

<u>Column 4,</u>
Line 54, "claim 8" should read -- claim 8, --.

<u>Column 7,</u>
Line 37, "claim" should read -- claim 51, --.

Signed and Sealed this

Twenty-seventh Day of April, 2004

JON W. DUDAS
*Acting Director of the United States Patent and Trademark Office*